United States Patent [19]

Iwata

[11] Patent Number: 4,754,352
[45] Date of Patent: Jun. 28, 1988

[54] MAGNETIC DRUM RECORDING APPARATUS

[75] Inventor: Tetsuya Iwata, Nagaoka, Japan

[73] Assignee: Alps Electric Co., Ltd., Japan

[21] Appl. No.: 865,872

[22] Filed: May 21, 1986

[30] Foreign Application Priority Data

May 21, 1985 [JP] Japan .............................. 60-75545[U]
Jun. 5, 1985 [JP] Japan .............................. 60-84757[U]
Jun. 5, 1985 [JP] Japan .............................. 60-84759[U]

[51] Int. Cl.⁴ .......................... G11B 5/004; G11B 5/54
[52] U.S. Cl. ...................................... 360/100; 360/105
[58] Field of Search ........................ 360/100, 106, 105

[56] References Cited

U.S. PATENT DOCUMENTS 3,613,059 10/1971 Dirks .................................. 360/100
3,682,481 8/1972 Whitlock ............................. 360/100
4,161,004 7/1979 Dalziel ................................ 360/106
4,604,667 8/1986 Kinjo .................................. 360/100

FOREIGN PATENT DOCUMENTS 57-133575 8/1982 Japan .................................. 360/100

Primary Examiner—A. J. Heinz
Attorney, Agent, or Firm—Guy W. Shoup

[57] ABSTRACT

A magnetic drum apparatus has a rotatable magnetic drum, a carriage adjacent the drum movable on a guide shaft along the drum axis, a magnetic head and slider assembly supported on the carriage, and a drive motor for the drum mounted in the inner chamber of the drum. The carriage is rotatable on a guide pin in a direction away from the surface of the drum when it is moved to an axially retracted position.

5 Claims, 6 Drawing Sheets

MAGNETIC DRUM RECORDING APPARATUS

FIELD OF THE INVENTION

This invention relates to a magnetic drum recording apparatus for magnetically recording signals on the outer peripheral surface of a cylindrical, magnetic drum.

BACKGROUND OF THE INVENTION

There have conventionally been used a magnetic drum, magnetic tape, magnetic disc and the like as a magnetic recording medium for a computer. These mediums have some advantages and some disadvantages respectively and are individually selected for their most suitable uses. Totally the demand for magnetic discs is now largest in the industry in consideration of the operative speed, recording capacity, mounting space, etc. However, in accordance with recent development of microcomputers excellent in function and significantly miniaturized for portable use, the time has come when the industry must reconsider the situation.

Figure 6:
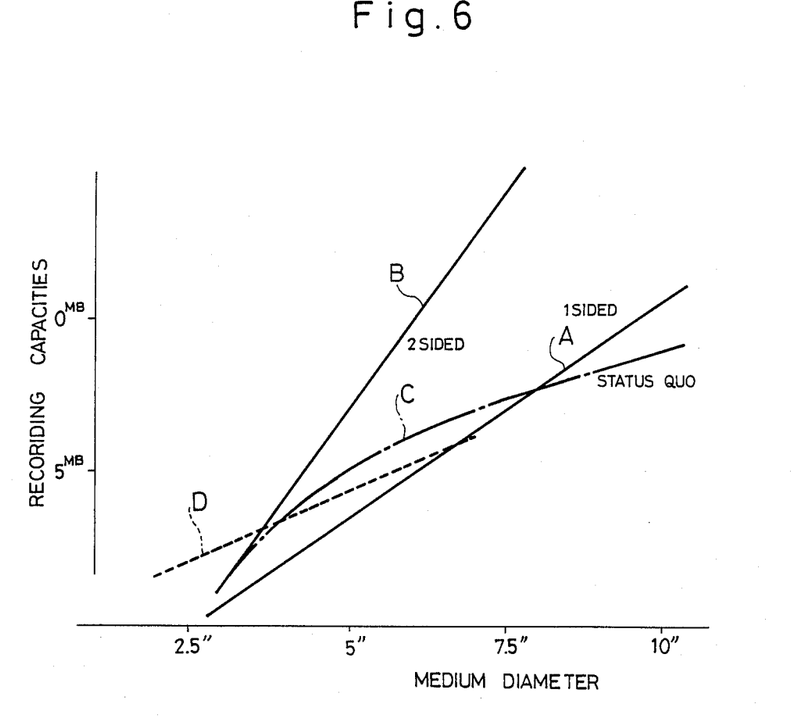
FIG. 6 is a graph comparatively showing recording capacity characteristics of magnetic drums and magnetic discs.

FIG. 6 shows the recording capacities of an existing magnetic disc and magnetic drum under fixed conditions, i.e. with 41.5 millimeters thick apparatuses, 300TPI and 10kBPI. The ordinate represents the recording capacity MB, and the abscissa indicates the diameter of the recording medium in inch.

Lines A and B show theoretical recording capacities of discs for single-surface use (line A) and two-surfaces use (line B). In practice, however, the expansion coefficient of the disc, the diameter of the spindle shaft and other material limit the recording capacities to the value shown by line C.

Drums have the recording capacities shown by dotted line D. In larger diameter ranges, discs provide larger recording capacities than drums. However, as the diameter decreases, the difference in recording capacity between discs and drums decreases, and drums provide larger capacities in 3.5 inches and less diameter ranges. This means that magnetic drums are suitable for use in compact systems where the diameter of the recording medium must be small.

Figure 7A:
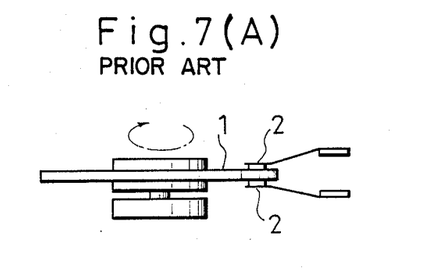
Figure 7B:
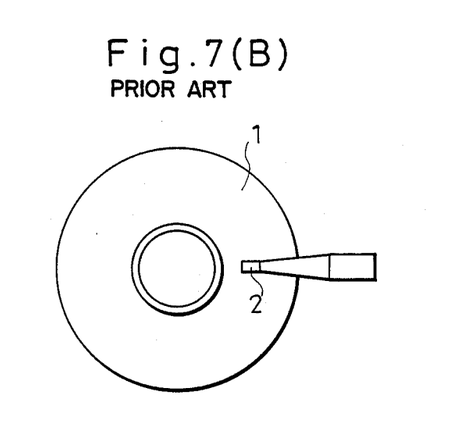
Figure 8A:
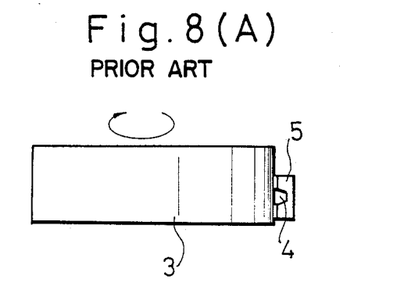
Figure 8B:
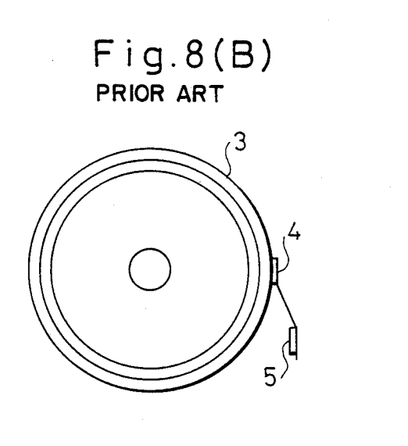

These circumstances are further explained in detail, referring to FIGS. 7 and 8. FIG. 7 at A and B schematically shows a two-surfaces-recording magnetic disc 1 with two magnetic heads 2—2 coplanarly, radially movable with respect to the disc 1. FIG. 8 at A and B schematically shows a magnetic drum 3 with a single magnetic head 4 movable axially along the outer peripheral surface of the drum 3.

Referring to FIG. 7, since the medium (disc 1) is rotated at a constant speed, the signal density changes from a large diameter turn and a small diameter turn, and becomes largest in the innermost turn. Since the recording capacity in each turn of a disc must be the same as the capacity of the innermost turn, the total recording density decreases as the diameter of the disc 1 increases. Additionally, the output magnitude of the head 2 changes proportionally to the relative movement velocity between the disc 1 and the head 2, and significantly decreases in the innermost turn where the relative velocity is smallest.

In view of the limitation to the number of tracks and the decrease of the output magnitude, the minimum effective diameter of a disc will be about 3.5 inches, and no disc cannot be used in an apparatus where a space of 2.5 inches or less is simply allowed for the diameter.

These problems involved in magnetic discs do not arise in magnetic drums because the magnetic drum 3 as shown in FIG. 8 is constant in diameter throughout the axial length thereof. Assuming that the diameter of a disc is 3.5 inches, the diameter of the innermost turn of a disc will be about 2.4 inches, and the total recording capacity of the disc is a value obtained by multiplying the capacity in the 2.4 inches diameter turn and the number of tracks. In the drum, however, all tracks have a uniform diameter of 3.5 inches and a uniform recording capacity which is 1.45 times the unit capacity of the disc. Thus, the total recording capacity of the drum is a value obtained by multiplying the significantly larger unit capacity and the number of tracks.

As described, in smaller diameter ranges, drums are sufficiently competitive to discs, and particularly in diameter ranges smaller than about 5 inches, drums are superior to discs in not only recording capacity but also signal processing facility.

However, there is a problem with a conventional magnetic drum recording apparatus wherein a belt used for driving the drum invites an increased dimension of the apparatus. This invalidates the above-mentioned advantages of drums in smaller diameter ranges.

Further, the prior art magnetic drum recording apparatus is configured as schematically shown in FIG. 8 where a single head 4 is provided adjacent the outer periphery of the drum 3 for axial movement along the periphery. Therefore, it is difficult to effectively use the entire axial length of the drum 3, and the access time is relatively long. More specifically, since the recording and reproduction head 4 is supported by a carriage which has a given length in the axial direction of the drum, if the movable range of the carriage is limited within the axial length of the drum 3, the entire length of the drum cannot be used for recording. If the carriage is configured to move in excess of the entire length of the drum in order to use the entire axial length of the drum for recording, a larger-scaled mechanism for moving the carriage will be necessary, and the access time will be further increased.

OBJECT OF THE INVENTION

It is therefore an object of the invention to provide a small-scaled magnetic drum recording apparatus with a small-scaled drum driving mechanism, which eliminates the problems involved in the prior art.

A further object of the invention is to provide a magnetic drum recording apparatus wherein the entire axial length of a magnetic drum can be effectively used for recording signals thereon, not increasing the scale of a head carrying mechanism and decreasing the access time.

A still further object of the invention is to provide a magnetic drum recording apparatus including a head drive mechanism which does not require a high accuracy of a drive motor but can reliably move a carriage at a smaller movement pitch than that in the prior art system, in order to increase the recording capacity, without inviting an increased manufacturing cost.

SUMMARY OF THE INVENTION

According to the most general feature of the invention, the magnetic drum recording apparatus includes a drive motor located inside a magnetic drum to rotatably drive same. This arrangement does not require any specific, unique space for drum driving means and therefore permits a significant reduction of the entire dimension of the apparatus.

In a preferable form of the invention, there are used two or more recording and reproduction heads spaced in the axial direction of the drum, unlike the prior art system wherein a single head is movably provided adjacent the outer peripheral surface of the magnetic drum. This permits effective use of the entire axial length of the magnetic drum and a reduction of the access time, not inviting an increased scale of the head carrying mechanism.

In a further preferable form of the invention, there is provided a running block system for driving a carriage by a movement pitch which is one half of a value corresponding to one unit rotation angle of the drive motor, in order to increase the recording capacity or density and to decrease the torque required for the motor drive. The running block system includes a roller supported by the carriage and driven by same in the axial direction of the magnetic drum, and a drive belt engaging the roller in a folded fashion. One end of a segment of the belt extending from the roller substantially parallel with the movement direction of the carriage is secured to a fixed position of the apparatus, and the other end of the belt is secured to a rotation axle of a drive motor. Since the roller on the carriage serves as a running block and reduces the movement pitch of the carriage to one half the pitch in the prior art arrangement wherein the belt directly connects the carriage to the axle of the drive motor, the recording capacity or density is doubled in this arrangement of the invention.

BRIEF DESCRIPTION OF THE DRAWINGS

FIG. 7 is a front elevation at (A) and a plan view at (B) of a prior art magnetic disc recording apparatus;

FIG. 8 is a front elevation at (A) and a plan view at (B) of a prior art magnetic drum recording apparatus;

DETAILED DESCRIPTION

The invention will be better understood from the description given below, referring to some preferred embodiments illustrated in the drawings.

Figure 1:
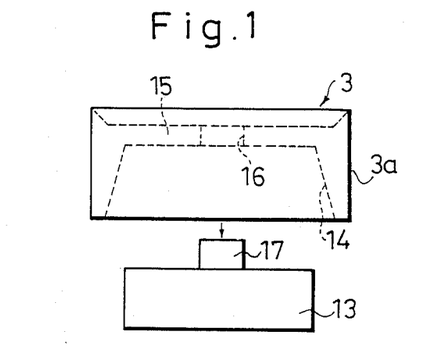
FIG. 1 is a front elevation of a magnetic drum and a drive motor in a magnetic drum recording apparatus according to the invention.

FIG. 1 shows a magnetic drum recording apparatus embodying the invention wherein a drive motor 13 for rotatably driving a magnetic drum 3 located most suitably for reduction of the entire dimension of the apparatus. The magnetic drum 3 defines therein a cylindrical, motor accepting chamber 14 fully opening to the bottom and substantially closed at the upper end by a disc-shaped upper plate 15 which has a hole 16 in the center. The drive motor 13 is configured to fit the inner space of the chamber 14 and has a rotatable shaft or bearing 17 which is accepted in the center hole 16. The magnetic drum 3 has a cylindrical outer peripheral surface which is used as a magnetic recording surface 3a.

Figure 9:
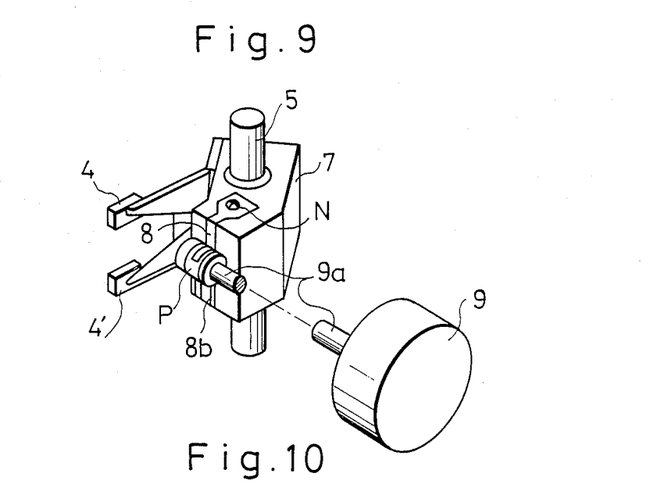
FIG. 9 is a perspective view illustrating how a drive motor drives a carriage which supports the heads shown in FIGS. 2 and 3.
Figure 10:
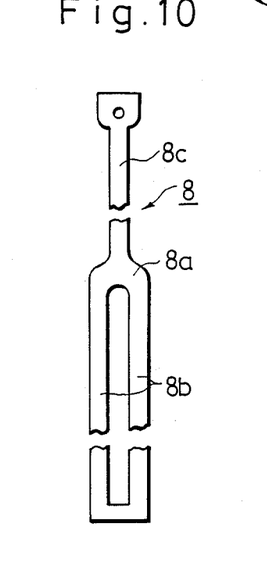
FIG. 10 is a plan view of a steel belt used in the structure of FIG. 9.
Figure 11:
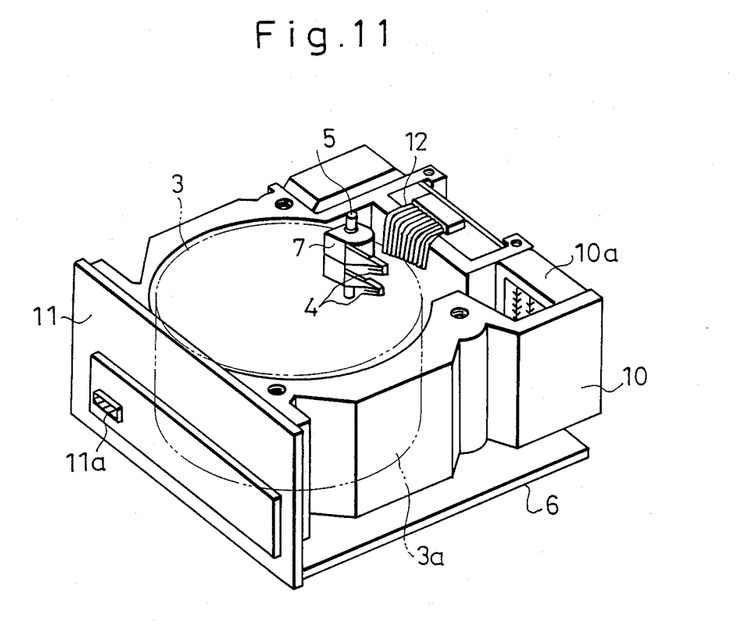
FIG. 11 is a perspective view of the entire aspect of a magnetic drum recording apparatus according to the invention.

Referring to FIGS. 9 through 11, a guide shaft 5 is secured to a base plate 6 and extends in the axial direction of and outside the drum 3. The guide shaft 5 supports a carriage 7 movably up and down. Vertically spaced magnetic heads 4—4 are secured to the carriage 7 and opposed to the magnetic recording surface 3a along the outer periphery of the magnetic drum 3 at a distance of 1 μm or less.

As shown in FIG. 9, the carriage 7 is linked to a rotation axle 9a of a drive motor (stepping motor) 9 by a steel belt (drive belt) 8. As best shown in FIG. 10, the steel belt 8 comprises a double line portion 8b and a single line portion 8c which extend in the opposite directions from a central portion 8a. A length of the steel belt 8 including the central portion 8a is wound by one turn about the rotation axle 9a and fixed to same, and the opposite ends of the double line portion 8b and the single line portion 8c are secured to the carriage 7. In FIG. 9, the central portion 8a is welded at P, and the single line portion 8c is fixed by a bolt N. When the drive motor 9 is rotated in the forward or reverse direction, the double line portion 8b or the single line portion 8c is rolled up by the rotation axle 9a, never intefering each other. As the result, the magnetic heads 4—4 are moved up or down to trace desired tracks on the magnetic recording surface 3a of the magnetic drum 3.

As shown in FIG. 11, the magnetic drum 3 and the carriage 7 are encircled by a frame 10 secured on the base plate 6 and having a filter 10a. Reference numeral 11 designates a front board or panel made of a sythetic resin and carries light emitting diodes (LED) 11a for indicating the operation mode of the system.

In the recording mode of the magnetic drum recording apparatus described above, the magnetic drum 3 is rotatably driven, the carriage 7 is moved up or down responsively to a forward or reverse rotation of the drive motor 9, and the magnetic heads 4—4 secured to the carriage 7 receive recording signals via a flat cable 12. The recording signals are first converted to recording data by a R/W amplifier mounted on the carriage 7, subsequently converted to a magnetic field by the coil of the magnetic head 4, and thence recorded on the magnetic recording surface 3a of the magnetic drum 3 by a magnetism generated by a gap of a core. In the recording mode of the apparatus, in a reverse fashion with respect to the recording mode, the gap of the core of the magnetic head picks up a change in the magnetic field on the magnetic recording surface 3a of the magnetic drum 3, the coil of the core converts the detected magnetic field into an electric current, and the R/W amplifier converts the current into a data and sends it out via the flat cable 12.

Figure 2:
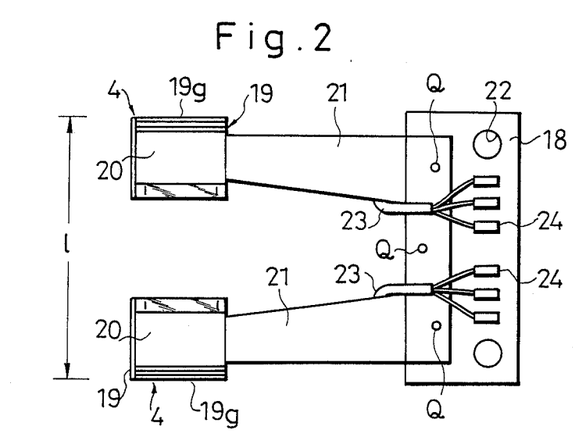
FIG. 2 is a front elevation of slider-and-head assemblies and a mount plate which will be fixed to a carriage in a magnetic drum recording apparatus according to the invention.
Figure 3:
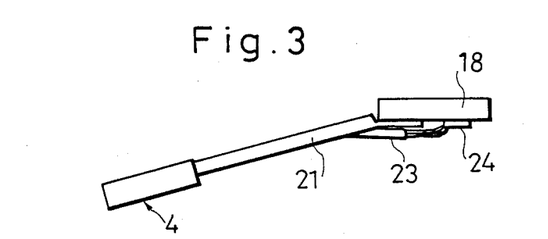
FIG. 3 is a plan view of the members shown in FIG. 2.
Figure 4:
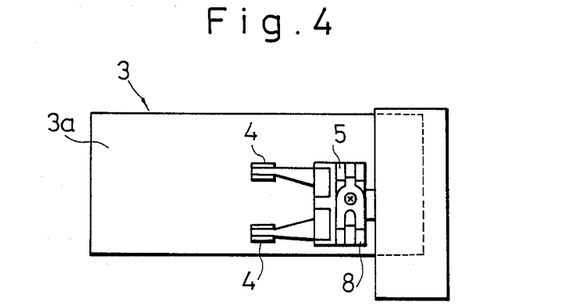
FIG. 4 is a plan view of the structure of FIG. 2 mounted together with the structure of FIG. 1.

FIGS. 2 and 3 illustrate a unique head arrangement wherein two head-on-slider assemblies 4—4 spaced in the axial direction of the drum 3 are supported on the carriage 7 by a mount plate 18. Each head-on-slider assembly 4 is a combination of a recording/reproduction head 19 and a slider 20 united together. Since the slider 20 and the recording/reproduction head 19 are properly opposed (engaged) to the magnetic recording surface 3a of the magnetic drum 3, the position of the recording/reproduction head 19 with respect to the magnetic recording surface 3a is stabilized to ensure proper recording or reproduction. In each head-on-slider assembly 4, the recording/reproduction head 19 is positioned outside the slider 20 in the axial direction of the magnetic drum 3. Reference numeral 19g designates a gap of a recording/reproduction core. Each head-on-slider assembly 4 is secured to a free end of a load spring 21 which is a kind of plate spring having the other end welded to the mount plate 18 at Q. Reference numeral 22 denotes a mount bore formed in the mount plate 18 for engagement with the carriage 7.

Lead wires 23 derived from the recording/reproduction heads 19 for transmitting recording/reproduction signals are connected to relay terminals 24 which are provided on the mount plate 18 and connected to a signal processing circuit not shown.

With this arrangement, the drive motor 13 rotates the magnetic drum 3, and the drive motor 9 moves the carriage 7, so that the recording/reproduction head 19 of the upper or lower head-on-slider assembly 4 moves to a desired track on the magnetic recording surface 3a to effect recording or reproduction. In this case, since two recording/reproduction heads 19 are provided in upper and lower positions, the heads 19 may share the magnetic recording surface 3a half by half. Therefore, the access time of the head 19 may be reduced as compared to the prior art apparatus wherein a single recording/reproduction head must move throughout the entire axial length of the magnetic recording surface 3a. More specifically, if there are a plurality of tracing areas on the magnetic recording surface 3a, the heads 19 may be moved to areas nearer to them respectively to reduce the access time as compared to a prior art apparatus using a single recording/reproduction head. Additionally, if the two recording/reproduction heads 19—19 are configured to operate in a time-sharing fashion in recording or reproduction of tracing areas, the access time may be further reduced.

The maximum movement distance of the carriage 7 may be reduced to about a half which will be enough to trace the entire length of the magnetic recording surface 3a by two heads 19—19, and the load springs 21 produce energies to bias the head-on-slider assemblies 4 toward the magnetic recording surface 3a. These features contribute to a simpler arrangement of the apparatus.

Since each head-on-slider assembly 4 is configured to locate the recording/reproduction head 19 outside and the slider 20 inside in the axial length of the magnetic drum 3, when the recording/reproduction head 19 is opposed to one axial limit of the magnetic recording surface 3a, the slider 20 is opposed to an axially inner portion of the surface 3a. Therefore, the entire axial length of the magnetic recording surface 3a is effectively used. If the recording/reproduction head 19 is located axially inside the slider 20, unused regions will remain at both axial ends of the magnetic recording surface 3a by a length corresponding to the axial length of the slider 20 which must always be opposed to and engaged with the surface 3a. If the slider 20 is moved over the axial limit of the surface 3a to bring the recording/reproduction head 19 to the limit, the head-on-slider assembly 4 cannot take its proper position or orientation with respect to the surface 3a and will fail to perform a quality recording or reproduction.

The proposed positional relationship between the slider 20 and the head 19 in the head-on-slider assembly 4 also contributes to reduction of the distance l (FIG. 2) between the two head-on-slider assemblies 4—4 and hence to reduction of the entire dimension of the apparatus. More specifically, two magnetic heads 4—4 are spaced in the axial direction of the magnetic drum 3 and fixed to the carriage 7 so that each magnetic head 4 is opposed to the magnetic recording surface 3a of the magnetic drum 3 with a distance of 1 $\mu$m or less. As best shown in FIG. 9, the carriage 7 is linked to the rotation axle 9a of the pulse motor 9 by the steel belt 8 to move up and down in response to a forward or reverse rotation of the pulse motor 9 and bring the heads 4 to desired tracks on the magnetic recording surface 3a coated on the outer periphery of the magnetic drum 3. To minimize the movement distance of the carriage 7, the magnetic heads 4—4 are preferably located nearest to the upper and lower ends of the carriage 7. In this arrangement, the length of the carriage 7 is one half or less with respect to the axial length of the magnetic drum 3.

Figure 5:
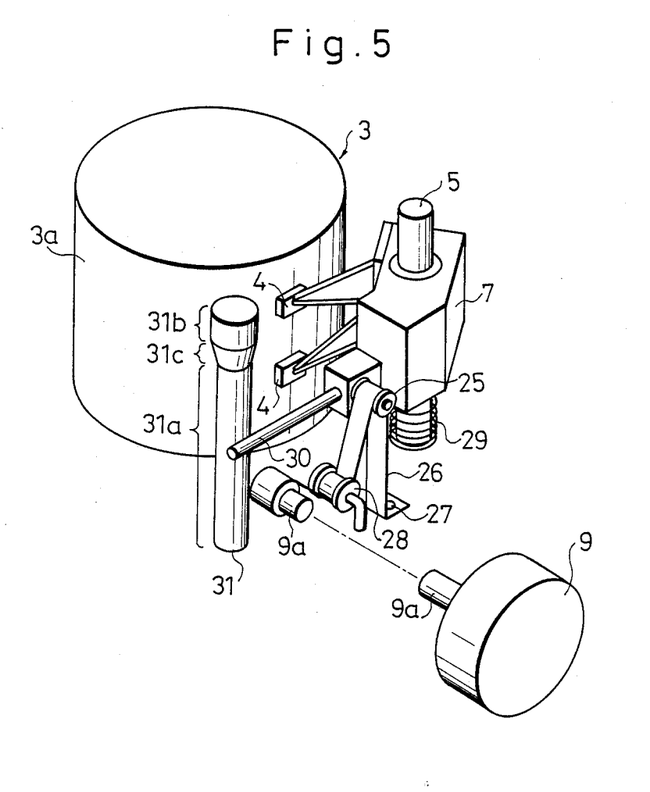
FIG. 5 is a perspective view of a further embodiment of the invention which includes another form of the magnetic head driving arrangement.

In a further embodiment of the invention shown in FIG. 5, the carriage 7 movably supported by the guide shaft 5 has a rotatable roller 25 engaging a steel belt 26. The steel belt 26 has one end secured to a portion of the apparatus by a bolt 27, and a limited length thereof between the bolt 27 and the roller 25 extends in parallel with the guide shaft 5. The steel belt 26 is once turned about 180 degrees at the roller 25 and engages a fixed block 28 at a fixed position. The steel belt 26 is turned again at the fixed block 28, and the other end thereof is secured to the rotation axle 9a of the drive motor 9. The carriage 7 is biased upward by a compression spring 29 so as to bring the roller 25 away from the fixed block 28. A guide pin 30 projects from the carriage 7 substantially in the radial direction of the guide shaft 5 and engages an outer peripheral portion of a guide pole 31 remote from the magnetic drum 3. The guide pole 31 is fixed outside the magnetic drum 3 in parallel with the guide shaft 5. The guide pole 31 comprises a small diameter portion 31a for maintaining the magnetic heads in the recording and reproducing position, a tapered portion 31c and large diameter portion 31b for establishing and off-drum position of the heads 4—4, so that the magnetic heads 4—4 take the recording and reproducing position for contact with the recording surface 3a when the guide pin 30 engages the small diameter portion 31a, and take the retreat position isolated from the recording surface 3a when the guide pin 30 engages the tapered portion 31c or large diameter portion 31b.

With this arrangement, when the drive motor is energized, one end of the steel belt 26 is pulled by the rotation axle 9a. Since the other end of the steel belt 26 is secured to a fixed position by the bolt 27, and the central portion is rolled on the roller 25 via the fixed block 28, the carriage 7 is moved along the guide shaft 5 in response to rotation of the rotation axle 9a. More specifically, the carriage 7 moves downward against the energy of the compression spring 29 when the rotation axle 9a takes up the steel belt 26, and moves upward when the rotation axle 9a supplies back the steel belt 26. The movement amount of the carriage 7 will be about a half the movement amount of the steel belt 26 on the rotation axle 9a because the roller 25 serves as a running block. More specifically, assuming now that the steel belt 26 is taken up on the rotation axle 9a by a millimeters by a unit angle rotation of the rotation axle 9a, the carriage 7 moves by a/2 millimeters. Therefore, a smaller movement pitch is established for the carriage 7 so as to increase the recording track density on the magnetic recording surface 3a accordingly.

The guide pin 30 projecting from the carriage 7 engages the small diameter portion 31a of the guide shaft in the recording or reproduction mode to properly locate the magnetic heads 4—4 for engagement with the magnetic recording surface 3a. However, when the carriage 7 is moved upward by the drive motor 9 when the magnetic drum 3 is stopped or by the compression spring 29 when the power supply is interrupted, the guide pin 30 engages the tapered portion 31c or the large diameter portion 31b of the guide pole 31. This causes the carriage 7 to rotate about the guide shaft 5 and bring the magnetic heads 4—4 away from the magnetic recording surface 3a. This results in protection of the magnetic heads 4—4 and recording surface 3a. The rotation of the carriage 7 is allowed to an extent by flexibility of the steel belt 25, but may be further ensured by arranging the drive motor 9 and the fixed block 28 pivotable by a distance corresponding to the difference between the radii of the small and large diameter portions 31a and 31b.

As described, the invention apparatus does not require any particular space for a magnetic drum driving mechanism because the magnetic drum is configured to be driven by the drive motor positioned inside itself. This greatly contributes to a significant reduction of the magnetic drum recording apparatus. Particularly, if the invention arrangement is applied to a magnetic drum recording apparatus using a magnetic drum of 5 inches or less diameter which drum is superior in recording capacity to a magnetic disc with the same diameter and provides a uniform diameter of tracks to ensure a uniform output magnitude, it is possible to provide an excellent recording apparatus for use in a light-weight, portable computer.

The use of a plurality of head-on-slider assemblies in the invention apparatus for movement along the magnetic recording surface of the magnetic drum leads to a significant reduction of the access time. The double-heads arrangement also contributes to a reduction of the movement distance of the carriage which supports the head assemblies, and hence enables a dimensional reduction and structural simplification of the carriage driving mechanism. The arrangement of each head-on-slider assembly in which the head is positioned outside the slider with respect to the axial length of the magnetic drum enables effective use of the entire axial length of the drum and permits a closer positional relationship between the two head-on-slider assemblies.

The use of two or more recording/reproduction heads provides further advantages that one of them will take the place of the other in malfunction and that the life of the apparatus will be elongated.

The invention arrangement, when using a running block mechanism to drive the carriage supporting the magnetic heads, can reduce the movement amount of the carriage per unit rotational angle of the drive motor to about a half the value in the prior art apparatus in which the carriage is directly connected to the drive motor. Therefore, a drive motor with the same capacity as a directly-connected drive motor can provide a double track density, or alternatively, the same track density can be obtained by a less expensive drive motor. Due to this, a small-scaled drive motor with a low torque can provide a high-load driving power. Further, since no gear mechanism is used, a backlash never occurs, and the invention provides a magnetic drum recording apparatus using a highly accurate drive mechanism.

We claim:

1. A magnetic drum recording apparatus, comprising:
   a magnetic drum rotatably driven on its axis and having an inner chamber defined by an inner peripheral surface of the drum and a magnetic recording surface on an outer peripheral surface of the drum;
   a drive motor mounted in the inner chamber of the drum for driving the drum;
   a carriage mounted outside the magnetic drum movable in parallel to the axis of the drum;
   at least one head-on-slider assembly supported on and moved by the carriage, said head-on-slider assembly being formed integrally with a slider and a magnetic head for recording on and reproducing from the magnetic recording surface of the drum;
   a guide shaft disposed parallel to the axis of the drum supporting the carriage so that it is movable in an axial direction along the magnetic recording surface of the drum and is pivotable about the guide shaft;
   rotation guide means for causing the carriage to pivot about the guide shaft when the carriage is axially moved to a retreat position along the axis of the drum, such that the magnetic head is moved away from the recording surface of the drum at the retreat position, said rotation guide means including a guide pole disposed in parallel with the guide shaft having a small diameter portion for establishing recording and reproducing positions of the magnetic head and a tapered portion gradually increasing in diameter from the small diameter portion for establishing the retreat position of the magnetic head, and a guide pin projecting from the carriage in a radial direction of the guide shaft and slidably engaging said portions of the guide pole.

2. A magnetic drum recording apparatus of claim 1 wherein the diameter of said magnetic drum is 5 inches or less.

3. A magnetic drum recording apparatus of claim 1 wherein a plurality of said head-on-slider assemblies are provided and spaced in the movement direction of said carriage, the outermost ones of said head-on-slider assemblies nearest to the respective ends of said carriage each being configured to locate said slider inside and said recording/reproduction head outside with respect to the axial length of said magnetic drum.

4. A magnetic drum recording apparatus of claim 1 wherein a plurality of said head-on-slider assemblies are provided and spaced in the axial direction of said magnetic drum.

5. A magnetic drum recording apparatus of claim 1 wherein said carriage has formed a roller engaging a central portion of a drive belt, one end of a segment of said drive belt which extends from said roller in the movement direction of said carriage being secured to a fixed position of said apparatus, and the other end of said drive belt being secured to a rotation axle of said drive motor.

* * * * *